United States Patent [19]

Reyes

[11] 4,223,912

[45] Sep. 23, 1980

[54] VEHICULAR WHEEL LOAD REDUCING DEVICE

[76] Inventor: Daniel Reyes, 233 Broadway, Rm 3615, Brooklyn, N.Y. 10007

[21] Appl. No.: 918,147

[22] Filed: Jun. 22, 1978

[51] Int. Cl.$^2$ .............................................. B60G 17/00
[52] U.S. Cl. .................................. 280/767; 180/24.02; 254/86 R; 280/43.2; 280/701
[58] Field of Search ......................... 152/13, 92, 261; 280/43.2, 719, 767, 766, 81 R; 180/15, 24.02, 1 AW; 254/86 R

[56] References Cited

U.S. PATENT DOCUMENTS

| | | | |
|---|---|---|---|
| 810,722 | 1/1906 | Cook | 280/767 |
| 1,403,687 | 1/1922 | Hillstrom | 280/767 |
| 2,452,110 | 10/1948 | Dourte | 280/767 |
| 3,763,910 | 10/1973 | Hawes | 152/92 |

Primary Examiner—John J. Love
Assistant Examiner—Donn McGiehan

[57] ABSTRACT

An automotive vehicle which includes, in a first design, the feature of extra wheels for subtracting the load weight on existing wheels, which in another design includes the feature of coil spring rimmed wheels, which in a further design includes the feature of a pair of coil springs between the wheel assemblies and the vehicle chassis, and including manual controls for adjusting the coil spring compression force, which in still a further design includes the feature of including manual controls for independently raising or lowering each wheel of the vehicle, and a still further feature includes sets of leaf springs in crossing longitudinal and transverse directions located between the wheel assemblies and the chassis.

4 Claims, 18 Drawing Figures

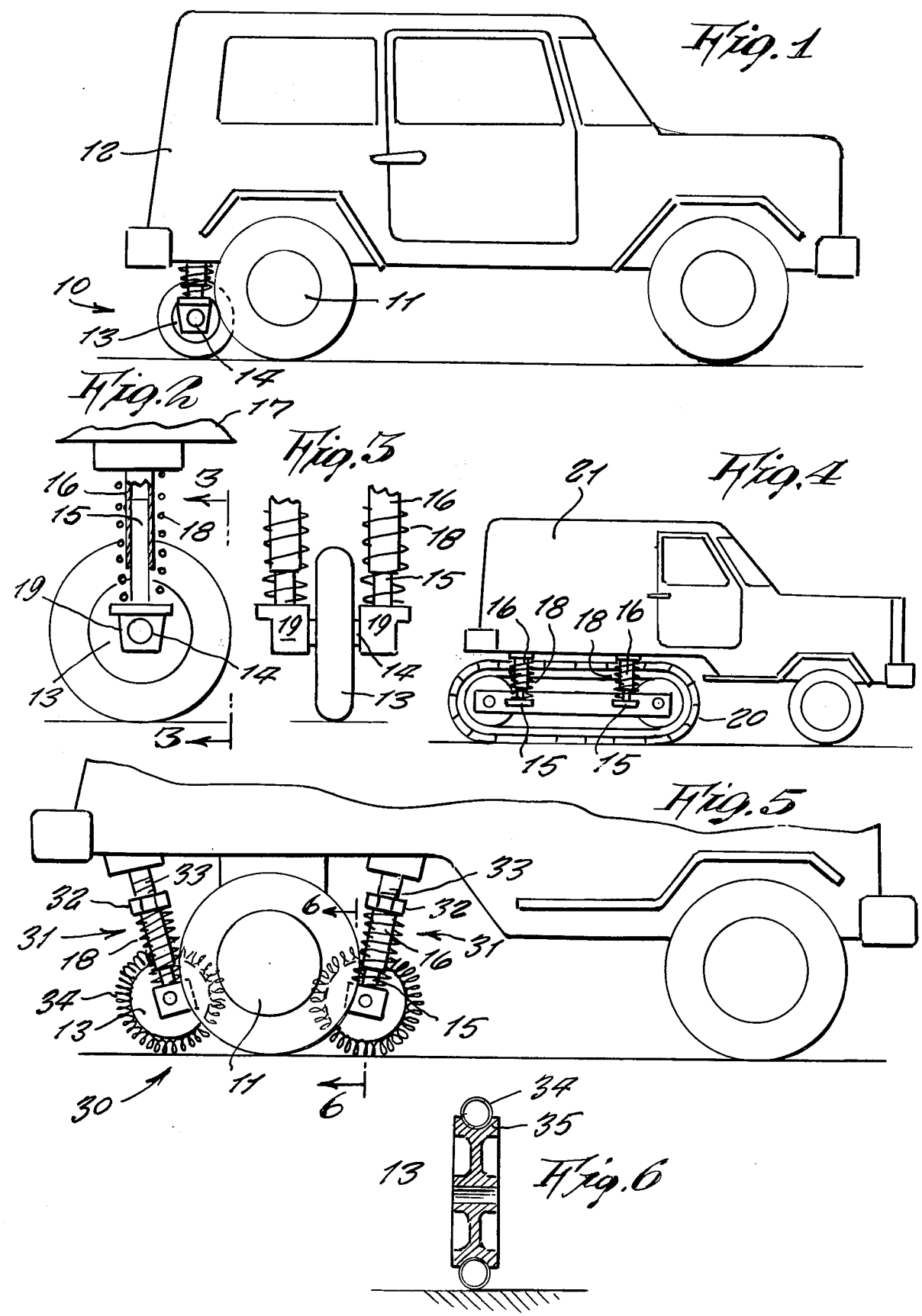

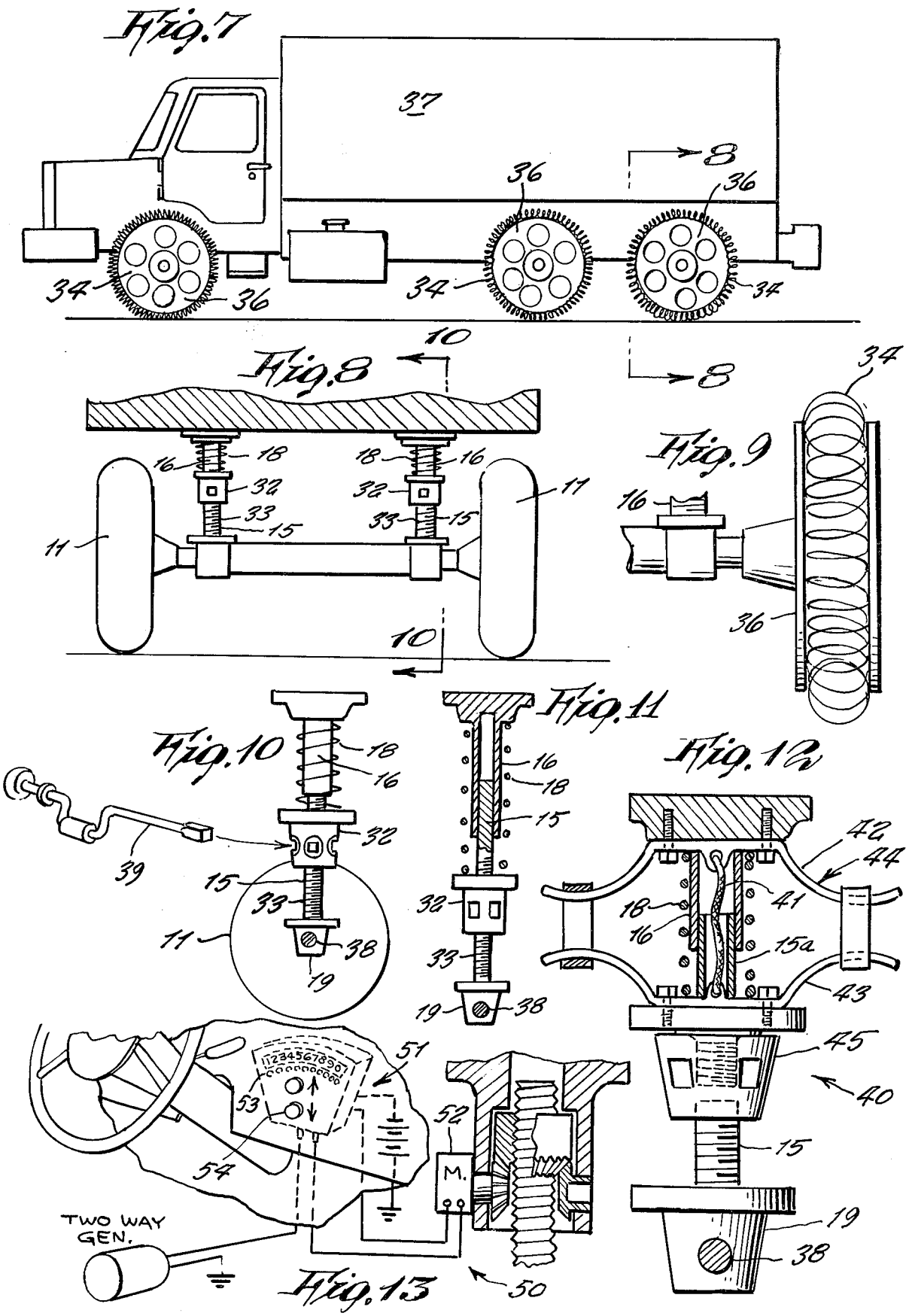

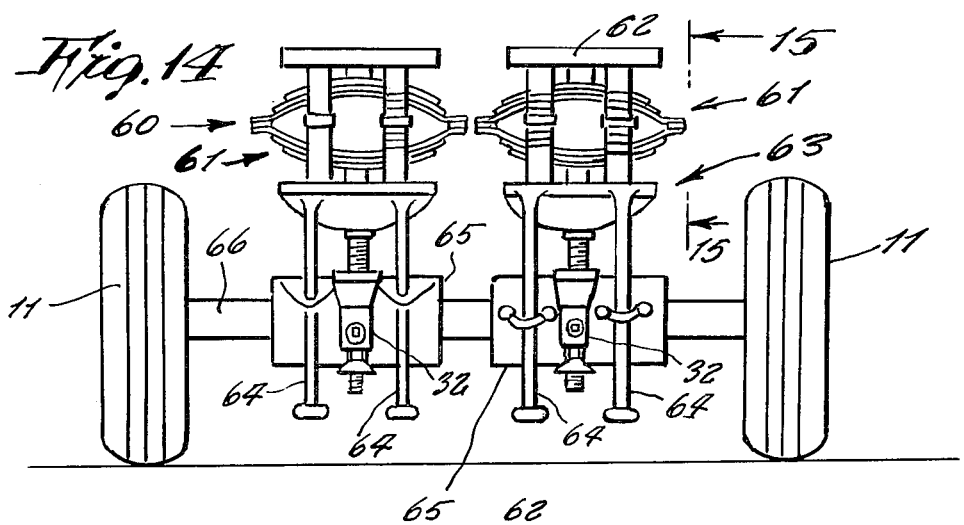
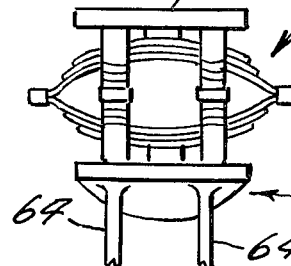
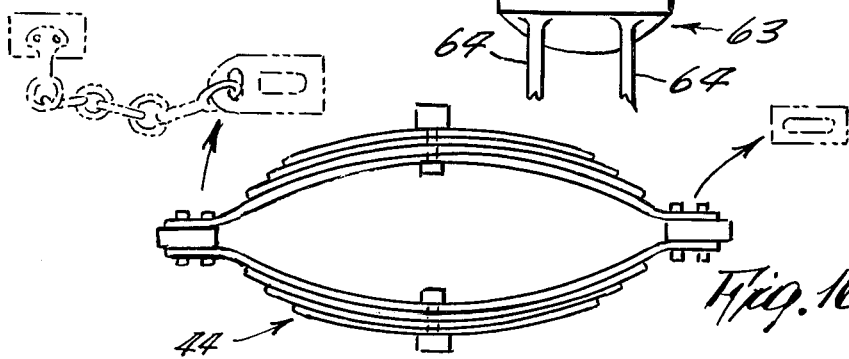
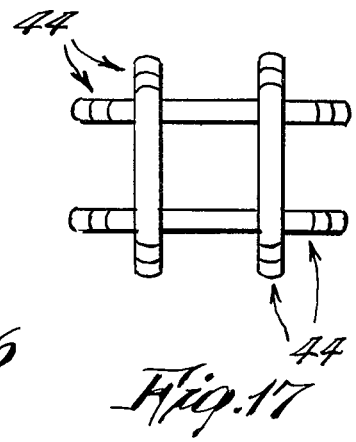
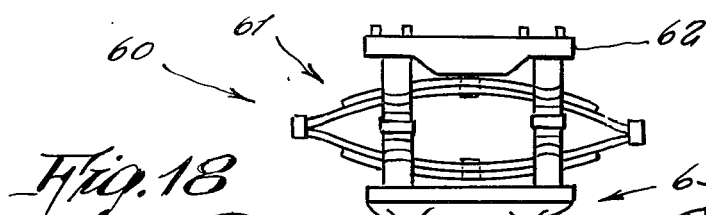
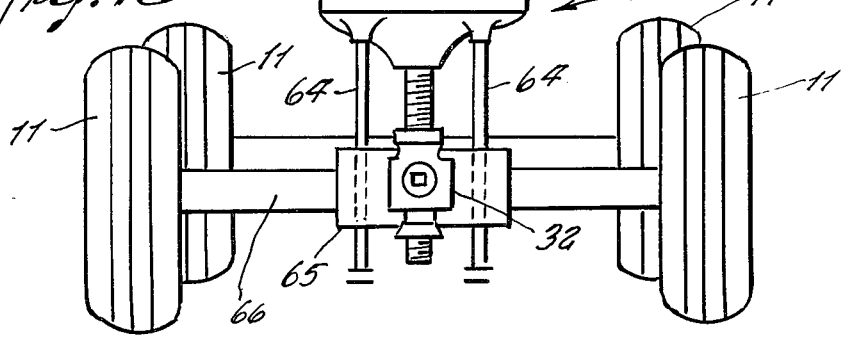

VEHICULAR WHEEL LOAD REDUCING DEVICE

SPECIFICATIONS

This invention relates generally to automotive vehicles, particularly such as can travel at a faster rates of speed on streets, roads and highways.

A principal object of the present invention is to provide an automotive vehicle in which there is a construction for reducing a carrying load for each wheel.

Another object is to provide a construction that is suitable for vehicles such as passenger motor cars, trucks, buses and the like.

Still another object is to provide a vehicle construction in which the reduced friction on each wheel results in an improved travel which at vastly increased faster speeds is smoother and safer.

Still another object is to provide a vehicle construction in which the wheels can be independently vertically adjusted, and wherein each wheel can be independently jacked up by remote controls operated by a driver either by manual means or else by controls located on a dashboard.

Still another object is to provide a vehicle construction in which wheels are fitted on their rims with coil springs for smoother rides while giving a more skid proof traction particularly on slippery surfaces, than is possible by a conventional air-inflated, rubber tire on a wheel.

Still another further object is to provide a vehicle construction in which leaf springs are located in sets of four crossing each other in longitudinal and transverse directions for improved shock absorption with ride stability.

These and other objects will become apparent from the following Specifications and Drawings wherein:

FIG. 1 is a side view of an automotive vehicle incorporating the present invention.

FIG. 2 is an enlarged detail thereof shown in cross section.

FIG. 3 is a view in direction 3—3 of FIG. 2.

FIG. 4 illustrates the invention incorporated into a caterpillar track vehicle.

FIG. 5 shows a modified design of the invention in which two units of the invention located close forwardly and rearwardly of a rear wheel assembly serve to provide a more smooth ride especially on uneven or pot-holed road, the wheel of the invention each having a coil spring rim for additionally smoother ride.

FIG. 6 is a cross section on line 6—6 of FIG. 5.

FIG. 7 is a side view of a truck incorporating the invention, and having the weight subtracting wheels at extreme rear.

FIG. 8 is a view in direction 8—8 of FIG. 7.

FIG. 9 is an enlarged detail thereof showing the spiral spring wheel rim.

FIG. 10 is a view in direction 10—10 of FIG. 8.

FIG. 11 is a further detailed cross sectional view thereof.

FIG. 12 is an enlarged view of a modified construction of the invention.

FIG. 13 is a diagram illustrating the vertical adjustment being controlled remotely from the vehicle dashboard.

FIG. 14 illustrates a spring support in which crossing sets of four leaf springs support a chassis on a wheel assembly.

FIG. 15 is a view in direction 15—15 of FIG. 14.

FIG. 16 is an enlarged detail of one of the leaf spring sets.

FIG. 17 is a top view of a four leaf spring set.

FIG. 18 is a view simular to FIG. 14 in which a single four leaf spring set is used, instead of two, between a chassis and a wheel assembly.

Referring now to the drawings in greater detail, and more particularly to FIGS. 1, 2 and 3 thereof, at this time, the reference numeral 10 represents a vehicular wheel load reducing device or unit according to the present invention which is positioned close to a conventional rear drive wheels 11 of vehicle 12, the device 10 including wheels 13 mounted on axle 14 having upstanding posts 15 slidable vertically in sleeves 16 extending downward from chassis 17. A coil compression spring 18 urging between axle bearing blocks 19 and the chassis is located around each sleeve.

It is now evident that this construction gives a smoother ride at fast rates of speed, particularly on rough surfaced roads.

In FIG. 4, the above described device 10 is incorporated between a endless track wheel assembly 20 and a chassis or body of truck 21.

In FIGS. 5 and 6, a modified device 30 includes units 31 inclined downwardly toward front and rear sides of conventional rear drive wheels 11, each unit including the above described structure but which additionally includes the upper ends of the compression coil springs 18 to bear against a nut 32 that is vertically adjustable along a screw thread 33 provided around an outer side of the sleeve 16. Also the wheel 13, instead of being conventionally rubber-tired is fitted with a continuous tension coil spring 34 seated in peripheral groove 35.

This design increases the effectiveness of the design of FIG. 1 in forwardly and rearwardly direction and the coil-spring fitted wheel rim will prevent the dangerous occurance of skidding on ice when a braked wheel gets locked, the present design allowing the spring to contract and stretch so to still maintain a road surface traction so to slow or stop a vehicle.

In FIGS. 7, 8 and 9 the design of FIGS. 5 and 6 is applied to all conventional wheels 36 of a truck 37. In FIG. 8 thereof however, the compression spring 18 is located between the nut 32 and the chassis instead and the thread 33 is on the post instead on the sleeve. The wheels in this figure are also shown rubber tired.

FIGS. 10 and 11 showing the above-described structure in greater detail, show the bearing block 19 mounted on the conventional drive or steering wheel axle 38.

In FIG. 12 a device 40 is shown in which the above described post and sleeve are connected with a limit cable 41, centered therein and secured at opposite ends to the wheel and chassis assemblies to prevent post 15a and sleeve 16 from separating at extreme vertically extended position. The cable 41 is located between upper and lower leaves 42 and 43 of a leaf spring set 44 positioned between the chassis and turnbuckle 45 threadedly mounted on post 15. Adjustment of spring compression is effected by rotating turnbuckle 45 with a wrench such as seen in FIG. 10.

In FIG. 13 a device 50 is shown wherein a remote control unit 51, operated from a dashboard of a vehicle, operater a motor 52 so to cause a post 15 to be raised or lowered. Push buttons 53 on the control panel select a wheel for adjusting while push buttons 54 indicate to lift or lower the same.

In FIGS. 14 through 18 a construction 60 is shown in which leaf spring assemblies 61 are used between a chassis 62 and wheel assemblies 63, each leaf spring assembly being comprised of four sets 44 of leaf springs which are arranged in two parallel spaced apart pairs crossing each other at right angle so to extend longitudinally and transversely respective to the vehicle the sets being interfitted together as shown in the drawing. These figures show guide posts 64 slidable mounted through block 65, which is integral with axle housings 66, the lower ends of the guide posts having enlarged heads 67 for limiting the downward travel of the block 65.

While various changes may be made in the detail construction it is understood that such changes will be within the spirit and scope of the present invention as in defined by the appended claims.

What is claimed is:

1. A vehicle construction incorporating a wheel load reducing means, comprising in combination, a vehicle body and chassis spring supported upon a plurality of wheel assemblies, including plurality of additional wheel devices positioned close to the wheels of said wheel assemblies for traveling on a ground surface near said wheels of said wheel assemblies, said wheel devices including wheels having a peripheral groove in which a tension coil spring is fitting for engaging said ground surface wherein said wheel devices each include a wheel being mounted on an axle supported in blocks integral with a pair of upward extending posts each slidable within a sleeve affixed to said chassis and a compression coil spring mounted on each said sleeve resiliently biasing said posts and sleeves in opposite directions wherein said wheel devices are located forwardly and rearwardly of said wheel assembly and are downwardly inclined toward said wheel assembly.

2. The combination as set forth in claim 1 wherein each said device includes a nut adjustably mounted thereon for adjusting spring compression.

3. The combination as set forth in claim 1 including means for adjusting the spring compression.

4. The combination as set forth in claim 1 wherein at least one leaf spring assembly is located between each said wheel device and said chassis each said leaf spring assembly being comprised of opposing sets of leaf springs, extending symmetrically from said post and sleeve.

* * * * *